F. R. ALFORD.
SPRING TESTING APPARATUS.
APPLICATION FILED FEB. 7, 1911.
1,007,171.
Patented Oct. 31, 1911.
2 SHEETS—SHEET 1.
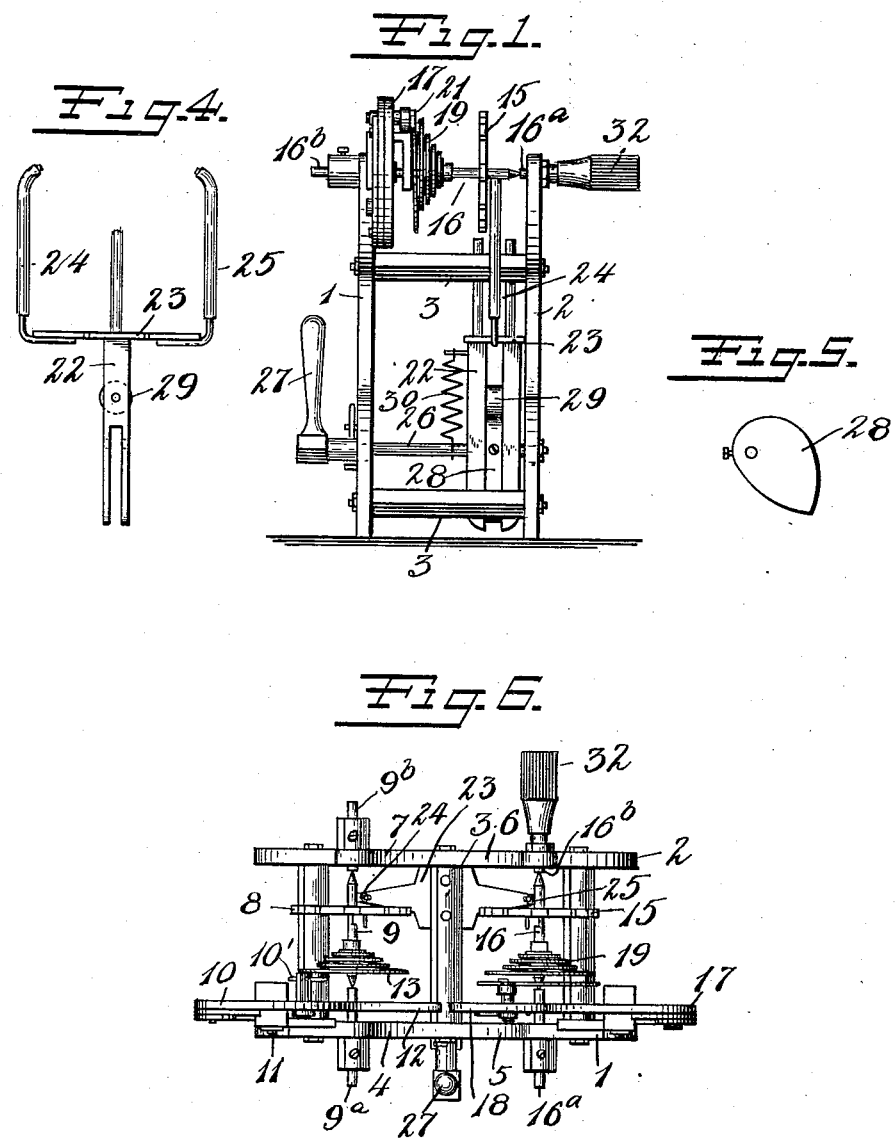
Witnesses:
Inventor
F. R. Alford
By his Attorneys F. R. ALFORD.
SPRING TESTING APPARATUS.
APPLICATION FILED FEB. 7, 1911.
1,007,171.
Patented Oct. 31, 1911.
2 SHEETS—SHEET 2.
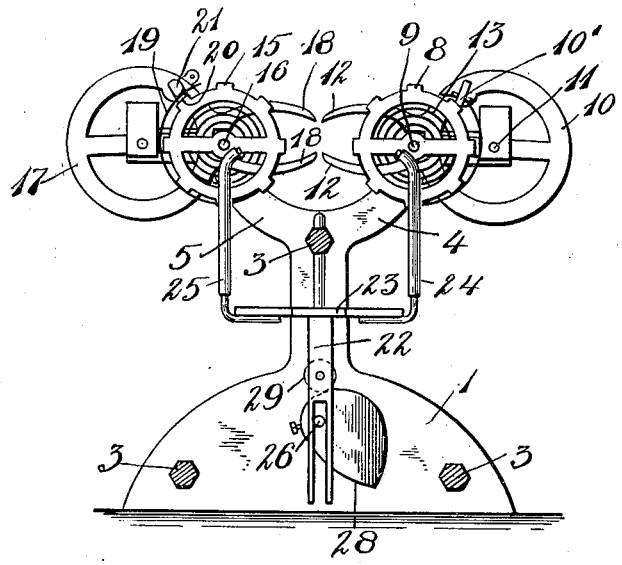
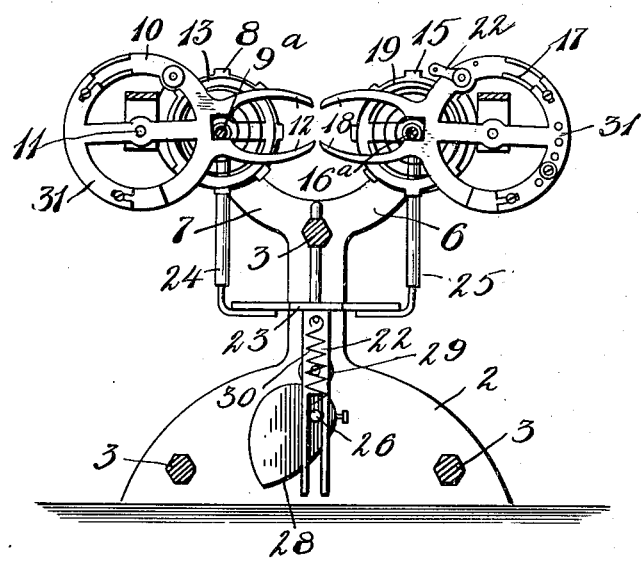
Witnesses:
Inventor
F. R. Alford
By his Attorneys

UNITED STATES PATENT OFFICE.

FRANK R. ALFORD, OF WINSTED, CONNECTICUT, ASSIGNOR TO WM. L. GILBERT CLOCK COMPANY, OF WINSTED, CONNECTICUT, A CORPORATION OF CONNECTICUT.

SPRING-TESTING APPARATUS.

1,007,171.  Specification of Letters Patent. Patented Oct. 31, 1911.

Application filed February 7, 1911. Serial No. 607,029.

*To all whom it may concern:*

Be it known that I, FRANK R. ALFORD, a citizen of the United States, residing at Winsted, county of Litchfield, State of Connecticut, have invented certain new and useful Improvements in Spring-Testing Apparatus, of which the following is a full, clear, and exact description.

My invention relates to spring testing appliances the same being particularly adapted for testing so-called hair springs for watches and other timepieces, the purpose of the invention being to provide a simple and effective mechanism whereby such springs may be tested with the greatest accuracy.

In the drawings, Figure 1 is an end elevation of the entire apparatus. Fig. 2 is a rear elevation with part of the frame removed. Fig. 3 is a front elevation with part of the frame removed. Fig. 4 is a side elevation of a detail. Fig. 5 is a view of a cam. Fig. 6 is a plan view of the apparatus.

Before proceeding to describe the construction of the device, it would be well to briefly outline how the apparatus is used. The apparatus is constructed with two oscillating members, to one of which is connected a master spring so that when said device is started, the master spring will oscillate the same at the proper speed. The duplicate oscillating member is so arranged that the spring to be tested may be connected therewith in such a manner that when the second oscillating member is started at the same speed as the first mentioned oscillating member, the operator can, by watching the operation of the second member, ascertain whether the spring driving the second oscillating member, and being tested, corresponds in strength and operation to the master spring, suitable indicating mechanism being employed whereby any difference in operation may be readily detected.

In the drawings, 1—2 represent the front and rear frame plates of the apparatus respectively. These are suitably connected by cross-braces 3—3. Each of the frame plates 1—2 is bifurcated at its upper end, each arm of the bifurcated fork supporting duplicate spring testing devices. The bifurcated arms on the plate 1 are indicated at 4—5 respectively, while the bifurcated arms on the plate 2 are indicated at 6—7. These arms are arranged in sets when the frame is assembled whereby the arm 6 will coöperate with the arm 5, and the arm 4 with the arm 7.

8 is what I will term a master balance wheel mounted upon the arbor 9, which is suitably journaled at its ends in adjustable bearing pins $9^a$ $9^b$.

10 is an oscillating indicating member pivotally mounted at 11. This member is made of non-magnetic material, preferably aluminum.

12—12 are two laterally projecting prongs from the oscillating indicating member, which I will term indicating pointers, said indicating pointers extending around and free at all times of bearing pin $9^a$.

13 is a master spring connected at one end to the arbor 9 at the other end to the oscillating member 10 at 10′. The bearing pin $9^a$ acts as a stop between the two arms 12—12 of the oscillating member 10 and limits the range of oscillation of the same.

From the foregoing it is apparent that if the arbor 9 is turned so as to increase the tension on the spring, and then released, said spring will unwind and revolve the balance wheel 8 a certain distance or number of revolutions in one direction until the spring opposes its further movement, whereupon said spring will reverse the rotation of said balance wheel and by this means said balance wheel will be rotated in opposite directions until the stored energy in the spring is exhausted. At the end of each rotation of the balance wheel, the indicating member 10 and its pointers 12 will oscillate to a limited degree determined by the stop pin $9^a$ so that each oscillation can be carefully and readily observed.

Between the arms 5 and 6 and mounted adjacent thereto are duplicate parts, namely, the balance wheel 15, the arbor 16 mounted in bearings $16^a$ and $16^b$, the oscillating member 17 having the indicating pointers 18—18.

19 is a spring to be tested. This spring is anchored at one end to the arbor 16 and is connected to the oscillating member 17 at a point corresponding to the connection between the spring 13 and the oscillating member 10, but in this instance, a simple and easily operated mechanical means is provided for connecting and disconnecting the spring to be tested in such a manner that its adjustments may be quickly effected. In this instance the means consists of a bearing shoulder 20 on the indicator 17 with which an eccentrically mounted wedge member 21 operated by an arm 22 on the front of the indicator 17 coöperates and by which the end of the spring may be adjustably clamped to the indicator 17. It is obvious that if the spring 19 is so mounted between its two points of connection that it exerts the same force as the master spring 13, and if the arbor 16 is rotated at the same speed as the arbor 9, the two oscillating members 10 and 17 will oscillate absolutely uniformly and synchronously, and the two sets of pointers 12 and 18 will rise and fall in absolute unison. If, however, the spring to be tested varies from the master spring, the oscillating members will not so oscillate, and the variation may be quickly detected by observing the relative movements of indicating pointers 12—18. If a variation in such movements is detected, the adjustment of the spring to be tested may be readily varied by varying its connection with the oscillating member 17, whereupon the parts may again be operated for the purposes of testing. The means for driving the balance wheels 8—15 for the purpose of starting the vibrations comprises a vertical slide 22 having a cross-head 23. At the opposite ends of the cross-head 23 are upwardly projecting yielding arms 24—25. These arms are preferably provided with a covering, preferably of rubber. The extreme upper ends of each of the arms are bent slightly toward each other. The slide 22 is suitably mounted in the frame of the machine for movement up and down. Passing through the frame is a shaft 26 having a handle 27 at its outer end and having a preferably heart shaped cam 28 mounted in proximity to the slide 22, and preferably so as to engage an anti-friction roller 29 thereon.

30 is a spring for pulling the slide 20 downwardly. When the slide is in its down position, the upper ends of the arms 24—25 are entirely free of the arbors 9—16. When, however, the cam 28 is turned, the slide is moved upwardly and the arm 24 will engage with the arbor 9, while the arm 25 will engage with the arbor 16. When the slide has been raised to its highest elevation by the cam 28, the operator releases the handle 27, whereupon the spring 30 quickly draws down the slide so that on the downward movement, the arms 24—25 will rotate the arbors 9—16 in opposite directions, and at precisely the same speed, thus starting the balance wheels 8—15 in motion to secure the testing oscillations hereinbefore referred to. The oscillating members 10—17 may be provided with suitable adjustable counterweight devices 31—31 whereby the same may each be balanced with the greatest care and accuracy. The arbor which is to carry the spring which is to be tested may have one of its bearings, for example, the bearing 16$^b$, provided with a handle 32 which will enable the operator who is testing the springs to quickly remove the arbor when he desires to substitute another spring and balance wheel.

The double indicating fingers on each of the indicator arms makes it possible to observe variations in the vibrations of said indicators very much more quickly and accurately, as the eye the more quickly catches variations in the movements between the four adjacent moving points than would be the case if each indicator arm were provided with but a single indicator finger.

In using apparatus of the above description, great care must be exercised to avoid magnetization either of the master spring or the spring to be tested. This object is accomplished in my improved apparatus by making the indicator arms which tap upon the stop pins 9$^a$ and 16$^a$ of non-magnetic material, as for example, aluminum. This has the further advantage also of preventing these parts from sticking when they come in contact. Furthermore, the rubber covering of the driving arms or fingers 24—25 acts as an insulation which further prevents magnetization of the hair spring by the rolling action of these arms upon the arbors 9—16. The rubber covering also affords a better friction hold for the driving arms upon the arbors.

While I have herein described a particular embodiment of my invention, the same may be altered in details and relative arrangement of parts within the scope of the appended claims.

What I claim is:

1. A machine for testing and truing hair or balance springs comprising supports for the arbors of a testing spring and a similar spring to be tested, means for imparting motion to said arbors and simultaneously vibrating said springs, and vibratory indicators adapted to be attached to the free ends of the springs and to move in unison therewith, each of said indicators having a plurality of indicator fingers moving in paths adjacent the corresponding indicator fingers of the other.

2. A machine for testing and truing hair or balance springs comprising supports for a testing spring and a similar spring to be tested and their respective arbors, reciprocatory fingers for simultaneously imparting movement to said arbors and vibrating springs, and means influenced by the springs for indicating their respective vibrations, said means including a set of indicating fingers for each spring arranged to oscillate in adjacent paths.

3. A machine for testing and truing hair or balance springs comprising supports for the arbors of a testing spring and a similar spring to be tested, means for imparting motion to said arbors and simultaneously vibrating said springs, vibratory indicators adapted to be attached to the free ends of each spring to move in unison therewith and indicate their respective vibrations, and stops to limit the movement of said indicators, said indicators being formed of non-magnetic material to prevent magnetization of said springs.

4. A machine for testing and truing hair or balance springs comprising supports for a testing spring and a similar spring to be tested and their respective arbors, reciprocatory fingers for simultaneously imparting movement to said arbors and vibrating the springs, said fingers being faced with insulating and friction material to prevent magnetization of the springs and to afford a better grip upon the arbors, and means influenced by the springs for indicating their respective vibrations.

5. A machine for testing and truing hair or balance springs comprising supports for a testing spring and a similar spring to be tested and their respective arbors, means for imparting motion to said arbors and simultaneously vibrating said springs, and vibratory indicators adapted to be attached to the free ends of the springs to move in unison therewith and indicate their respective vibrations, the attaching means for the spring to be tested comprising a bearing shoulder on its indicator and a rotary cam member coöperating with said shoulder whereby said spring may be readily connected with and disconnected from said indicator.

6. A machine for testing and truing hair or balance springs comprising a support for a testing spring and a similar spring to be tested and their respective arbors, reciprocatory fingers for simultaneously imparting movement to said arbors and vibrating the springs, a cam for actuating said fingers and shaped to permit uniformly accelerated movement of said fingers, and means for operating said cam.

7. A machine for testing and truing hair or balance springs comprising a support for a testing spring and a similar spring to be tested and their respective arbors, reciprocatory fingers for simultaneously imparting movement to said arbors and vibrating the springs, a heart-shaped cam to actuate said fingers and arranged to permit a uniformly accelerated movement thereof, and means to operate said cam.

8. A machine for testing or truing hair or balance springs comprising supports for a testing spring and a similar spring to be tested and their respective arbors, means for imparting motion to said arbors and simultaneously vibrating said springs, and vibratory indicators adapted to be attached to the free ends of the springs to move in unison therewith and indicate their respective vibrations, said indicators having adjustable balance weights carried thereby.

9. A machine for testing and truing hair or balance springs comprising supports for the arbors of a testing spring and a similar spring to be tested, means for imparting motion to said arbors and simultaneously vibrating said springs, and vibratory indicators adapted to be attached to the free ends of the springs to move in unison therewith and indicate their respective vibrations, each of said indicators comprising a plurality of indicating arms at their adjacent ends, said arms being arranged in pairs whereby a plurality of relatively moving points will be presented to the eye of the observer.

10. A machine for testing and truing hair or balance springs comprising supports for the arbors of a testing spring and a similar spring to be tested, means for imparting motion to said arbors and simultaneously vibrating said springs, and vibratory indicators adapted to be attached to the free ends of the springs to move in unison therewith and indicate their respective vibrations, said indicators each comprising a plurality of indicator arms arranged adjacent corresponding arms of the other indicator, said indicators being provided opposite their indicating arms with adjustable counterbalanced weights.

FRANK R. ALFORD.

Witnesses:
SAMUEL A. WETMORE,
SAMUEL E. STARKS.

Copies of this patent may be obtained for five cents each, by addressing the "Commissioner of Patents, Washington, D. C."